United States Patent [19]
Milligan et al.

[11] 3,736,954
[45] June 5, 1973

[54] SELF-ATTACHING CHECK VALVE

[75] Inventors: Ronald R. Milligan, Chelsea; James W. Widenhofer, Jackson, both of Mich.

[73] Assignee: Sparton Corporation, Jackson, Mich.

[22] Filed: May 20, 1971

[21] Appl. No.: 145,133

[52] U.S. Cl..........................................137/525, 150/9
[51] Int. Cl................................................F16k 15/14
[58] Field of Search..................150/8, 9; 128/214 D, 128/272, DIG. 24, 283; 137/516.15, 525

[56] References Cited
UNITED STATES PATENTS

| 3,519,012 | 7/1970 | Van Patten | 137/525 X |
| 2,971,510 | 2/1961 | Berger | 128/283 |
| 3,283,757 | 11/1966 | Nelsen | 128/283 |
| 2,940,686 | 6/1960 | Windisch | 150/8 X |
| 3,343,542 | 9/1967 | Ericson | 150/8 X |
| 3,486,539 | 12/1969 | Jacuzzi | 128/272 X |

*Primary Examiner*—Martin P. Schwadron
*Assistant Examiner*—David J. Zobkiw
*Attorney*—Beaman & Beaman

[57] ABSTRACT

Check valve structure self-attachable to flexible sheet material, such as plastic film, wherein the check valve body is of an annular configuration having a central region through which passages are defined for fluid flow and a valve member of the flexible flap type limits flow through the passages in a single direction. The valve body includes shoulders and surfaces which cooperate with a two-piece retaining ring wherein the flexible sheet material is interposed between the shoulders and surfaces establishing a sealed interconnection between the valve body and flexible sheet.

2 Claims, 6 Drawing Figures

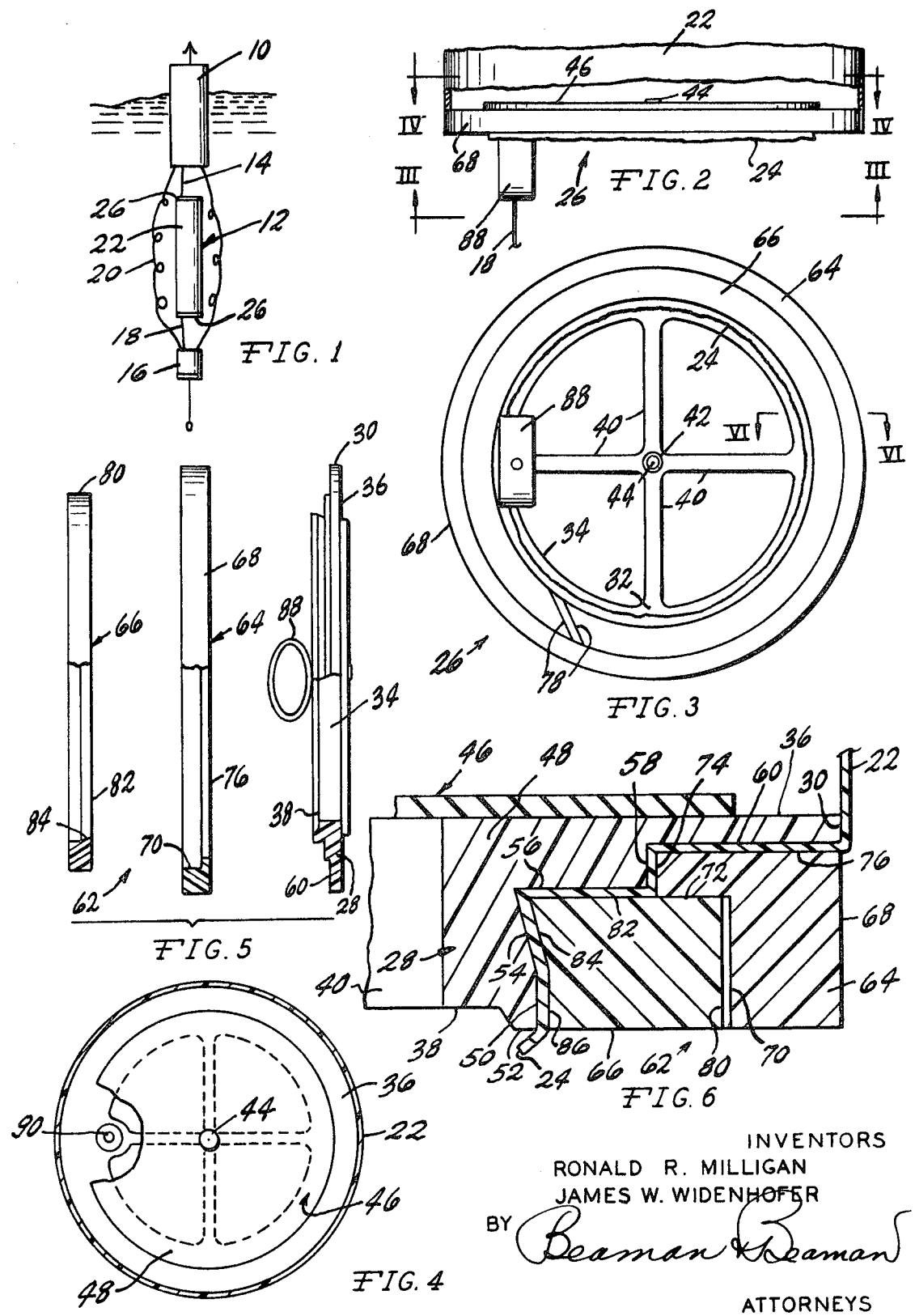

SELF-ATTACHING CHECK VALVE

BACKGROUND OF THE INVENTION

The invention pertains to check valve structure suitable for mounting to flexible sheet material wherein a sealed interconnection between the valve structure and sheet material is desired.

While it is known to mount valve mechanisms on flexible sheet material such as fabric, rubber or the like, those devices presently known are relatively heavy, bulky and expensive to manufacture. U.S. Pat. Nos. 2,404,020; 2,640,481 and 3,027,915 disclose various types of valve structure mounted upon flexible sheet material which are subject to many of the disadvantages of known devices of this type.

Most known valve devices of the above type require a specially shaped opening within the flexible material to receive the valve, and rivets, flanges and the like are utilized to establish a sealed interconnection between the valve and supporting material. Such requirements add to the cost of manufacture and complicate assembly techniques.

In the sonobuoy art wherein submarine and watercraft detection devices are submerged below the water surface there is a need for an inexpensive, lightweight, compact check valve for use with a damper which dampens the sonobuoy structure againt vibrations and movement. Such a damper may be formed of an elongated hollow tube of thin, flexible, sheet plastic film having a check valve located at each end wherein water may readily enter the tube, but the check valves prevent the water from leaving the tube. Thus, the water within the tube provides a substantially static mass capable of damping transducer structure supported from the tube against wave and current motion.

As sonobuoy components are often expendable since the sonobuoy usually sinks once its operating life terminates, and as the sonobuoy components must be compactly stored within a cannister prior to being deployed within the water, the damper structure must be both inexpensive and lightweight, and must be capable of being stored in a concise manner. Further, the assembly of the plastic film tube to the check valve is preferably mechanical to avoid the necessity of employing bonding agents or the like, and it is desired that the assembly be such that the valve is self-attachable, and, if desired, several layers of plastic film may be attached to the valve wherein the valve may be employed to assemble various plastic film components of the damper. In view of the highly flexible and very thin dimension of the plastic film used to construct the damper, substantially uniform compression forces are desired in order to achieve sealing between the valve structure and the film in order to minimize stress points and reduce the possibility of the film tearing. The utilization of rivets and conventional flange attachement structure as shown in U.S. Pat. No. 2,404,020 does not permit such a uniformity of force distribution, and in the practice of the invention several desired advantages over known prior art devices are achieved.

SUMMARY

It is an object of the invention to provide a compact, lightweight, inexpensive, self-attachable check valve structure for use with flexible sheet material wherein the valve structure may be readily attached to the sheet material, may be used to assemble various sheets of film material to the check valve and may be inexpensively produced and assembled.

A further object of the invention is to provide self-attachable check valve structure for use with flexible sheet material wherein the valve structure may be readily stored in a compact manner when associated with the flexible sheet material and yet may be quickly deployed and will be dependable in operation.

While the concept of the invention may be practiced in any environment wherein it is desired to attach a lightweight check valve to a fexible sheet material, the advantageous attributes of the invention are well utilized in damper structure employed with watercraft sonobuoy devices wherein the damper comprises an elongated tube of flexible sheet plastic film and has a check valve located at each end of the tube, wherein, upon the tube being deployed and extended its length, water enters the tube through a check valve and is trapped therein due to the unidirectional flow permitted by the valve. The valve employs a flexible flap type valve element, preferably formed of sheet rubber, or the like, which will open under minimum pressure conditions.

The valve structure body is preferably formed of a synthetic plastic material of a rigid nature and is in the form of a circular disc having a periphery, a central region in which the fluid passage is defined, and a rim region intermediate the periphery and passage. A rubber valve element extends across the passsae and is centrally attached to the passage configuration by a rivet wherein the periphery of the valve element may deflect from the circular seat defined upon the body member of the valve. A plurality of axially extending shoulders, and radially extending surfaces are defined upon the rim region, and at least one of the surfaces is of a conical configuration, or otherwise obliquely disposed to the axis of the valve body whereby an overhang or lip is defined for cooperation with a retaining ring. The retaining ring is formed with shoulders and surfaces complementary to those defined on the rim region of the body member and the flexible sheet material is interposed and maintained between the opposing shoulders and surfaces of the body member and retaining rimg. Preferably, the retaining ring is formed in two portions or sections, one of such sections being radially contractable and expandable for cooperation with the overhang or lip of the body member to maintain the retaining ring on the body member.

The two-piece construction of the retaining ring simplifies assembly of the valve body member to the flexible sheet film, and by the utilization of the plurality of radial and axially extending shoulders and surfaces, an effective sealing amd mechanical interconnection between the film and valve body is achieved without unduly stressing the sheet material.

Preferably, the passage through the central region of the body member includes webs extending thereacross which help support the valve element against collapse, and attachment means is defined upon the body member whereby mounting of the associated sonobuoy components to the damper assembly is achieved.

In that the valve structure is of a flat, disc-like, configuration the two identical valve devices employed with the damper occupy little space, and due to the highly flexible nature of the film, the entire damper assebmly, when stored within the sonobuoy cannister, occupies little space.

BRIEF DESCRIPTION OF THE DRAWINGS

The aforementioned objects and advantages of the invention will be appreciated from the following description and accompanying drawings wherein:

FIG. 1 is an elevational view of a typical sonobuoy assembly, when deployed, utilizing a damper having valve structure in accord with the invention, FIG. 2 is an enlarged elevational, partially sectioned, view of the lower end of the damper of FIG. 1, illustrating the valve structure, FIG. 3 is a bottom view of FIG. 2 as taken along Section III-III thereof, FIG. 4 is a sectional plan view as taken along Section IV—IV OF FIG. 2, illustrating the valve components within the damper structure, FIG. 5 is an exploded elevational, partially sectioned view of the valve body member and the two portions of the retaining ring, and FIG. 6 is an enlarged, elevational, cross-sectional view taken through the assembled valve structure rim region along Section VI—VI of FIG. 3, the valve structure being shown in the orientation of FIG. 2.

DESCRIPTION OF THE PREFERRED EMBODIMENT

The check valve structure in accord with the invention may be used in many applications wherein it is desired to attach or mount a light-duty check valve on flexible sheet material wherein the self-attaching features of the invention are of advantage. As the concepts of the invention are particularly suitable and desirable when used with sonobuoy damper structure, by way of illustration only, the description of the invention is made in this particular application. In FIG. 1, a typical, simplified sonobuoy structure is illustrated which may utilize the inventive concepts.

The disclosed sonobuoy assembly includes a hollow cylindrical cannister 10 adapted to float upon the water surface and within this cannister is located a radio transmitter, not shown, for transmitting signals received from the sonobuoy transducer, and floatation and antenna means are also incorporated into the cannister. The cannister lower region serves as the storage for those sonobuoy components deployed below the cannister, as illustrated, and such components include the damper 12 suspended from the cannister by suspension strand 14. The transducer 16, which includes means for sensing sound vibrations within the water, is suspended below the damper 12, by suspension strand 18, and electrical conductors 20 interconnect the transducer 16 to the transmitter structure within the cannister 10. Preferably, the suspension strands 14 and 18 are of an elastic, compliant nature, and the purpose of the damper 12 is to add a mass to the system which damps the movement of the transducer, particularly in a vertical direction, such as due to wave movement, and thereby minimizes vibration noises and the like which may be produced at the transducer due to transducer displacement.

The damper 12 consists of a cylindrical tube 22 of thin flexible synthetic plastic sheet film, such as polyethylene, and may be of a thickness as thin as .002 of an inch. Of course, the flexible sheet material may be of various compositions and thick-ness, and by regulating the dimensions and clearances of the valve structure a wide range of sheet material may be utilized with the valve structure of the invention.

The tube 22 is of a length considerably greater than its diameter, and the ends 24 of the tube are initially squared off as to be perpendicular to the tube length. No forming or shaping of the tube ends is required, other than being cut perpendicular to the tube axis.

The valve structure 26 at each end of the tube is of an identical configuration, and thus only one of the valve structure assemblies will be described. The valve structure is of a circular disc-like configuration, in practice having an overall diameter of approximately 3 ½ inches, and an axial dimension less than ¼ inch. The basic component of the valve structure is the body member 28 having a circular outer periphery 30 and a central region generally indicated at 32, FIG. 3. The central region 32 includes fluid passage 34 extending through the body member and intersecting the body member sides 36 and 38, which define the axial dimension of the body member at the central region. The passage 34 is of a circular configuration, concentric with the axis of the body member, and the body member includes webs 40 extending diametrically across the passage as apparent in FIG. 3. The webs are of an axial dimension corresponding to the distance separating the sides 36 and 38, FIG. 6. At the intersection of the webs a hole 42 is defined for receiving a rivet 44 which attaches the valve element 46 to the body member.

The valve element 46 is of a circular configuration, FIG. 4, and is preferably formed of a flat rubber, or rubber-like sheet material, and has a diameter greater than the passage 34, and less than that of the body member 28, FIG. 6, whereby the peripheral regions of the valve element rest upon the flat surface of side 36 to form a sealed relationship thereto wherein the portion of side 36 engaged by the valve element 46 functions as a valve seat. In that an edge of the webs 40 is in alignment with the side 36 the webs aid in the support of the valve element with respect to the passage 34 and aid in preventing collapse of the valve element, due to fluid pressure exerted on the valve element toward the passage.

The body member 28 includes an annular rim region 48 defined between the periphery 30 and the passage 34. This rim region has a cross-sectional configuration best appreciated from FIGS. 5 and 6 and includes a cylindrical axially extending shoulder 50 which intersects the surface 52 of the body member disposed adajcent the side 38. A shoulder 54, of a conical configuration intersects the shoulder 50, and also intersects the radially extending annular surface 56. The conical shoulder 54 and shoulder 50 define an overhang or lip due to the fact that the intersection of the surfaces 50 and 54 is at a greater radial dimension from the center of the body member 28 than is the intersection of the shoulders 54 and 56. As will be later appreciated, this overhanging lip functions to maintain the retainer ring on the body member.

An axially extending shoulder 58 is also defined on the body member at a location radially outward with respect to the shoulders 50 and 54, and this shoulder intersects a radially extending flat surface 60 which intersects the body member periphery 30.

The retaining ring, generally indicated at 62, is in two portions or sections as indicated at 64 and 66, FIGS. 5 and 6, and the sections are of cross-sectional configurations as will be appreciated from FIGS. 5 and 6. The ring portion 64 is of a continuous annular configuration having an outer diameter periphery 68 corresponding to the diameter of the body member periphery 30. An inner axially extending cylindrical shoulder 70 is defined on the ring portion 64 which intersects the radially extending surface 72 which in turn intersects the inner diameter shoulder 74. A flat radially extending surface 76 is also defined on the ring section 64, and as will be appreciated from FIG. 6, the shoulder 74 and surface 76 are in opposed relationship with the body member shoulder and surface 58 and 60, respectively, when the ring section 64 is assembled on the body member 28.

The section 66 of the retaining ring is also of an annular configuration having a cross-sectional configuration as will be appreciated from FIG. 6. However, the ring section 66 is "split" as at 78, FIG. 3, whereby the ring section is capable of limited radial contraction and expansion. Ring section 66 includes shoulder 80 which is in opposed relationship to the shoulder 70, a flat radially extending surface 82 is in opposed relationship to the body member surface 56, a conical shoulder 84 conforms to the conical shoulder 54, and is in opposed relationship thereto, and the cylindrical axially extending shoulder 86 is in opposed relationship to the body member shoulder 50.

Attachment of the strands 14 and 18 to the valve structure is accomplished by means of a loop 88, which may be formed of a reinforced fabric or rubberized material, and is attached to the body member 28 by a rivet 90, FIG. 4, and extends from the body member adjacent the side 38.

The valve structure is attached to the flexible sheet material of the tube 22 in the manner which will be appreciated from FIG. 6. Prior to the retaining ring 62 being placed upon the body member 28 the body member is disposed "inside" the flexible sheet tube adjacent but inwardly of an end 24. The tube material is then folded over the periphery 30 into engagement with surface 60 and the ring section 64 is then placed upon the body member such that the surface 76 is in opposed relationship to the surface 60, and the shoulder 74 is in opposed relationship to the shoulder 58.

After the ring section 64 is assembled in position the ring section 66 is inserted into place. The ring section 66 is inserted by first tilting the ring with respect to the axis of the body member 28 such that the intersection of the ring shoulder 84 and surface 82 adjacent a split end 78 may be inserted in opposed relationship to the shoulder 54, such as adjacent the intersection of the shoulders 50 and 54. Thereupon, the ring 66 may be pressed into the recess defined between the body member shoulders 54 and 50, and the outer ring shoulder 70, and by progressing circumferentially pressing around the ring section 66 the ring may be inserted into the recess such that the ring surface 82 will be in opposed parallel relationship to the body member surface 56 throughout the circumference of these surfaces and the shoulders 54 and 84 will be opposed and parallel. Of course, the dimensions of the body member 28 and ring portions 64 and 66 are closely controlled to permit the above desired form of assembly, and as the assembly causes the flexible sheet material to be bent through two right angles, and an angle less than a right angle, and as the retaining ring shoulders and surfaces 50 and 86, 54 and 84, 56 and 82, 58 and 74, and 60 and 76 engage the flexible sheet material in opposed relationship without creating undue compression thereon, a sealing relationship with the flexible sheet material is achieved which does not overstress or weaken the tube flexible film material, yet provides sufficient sealing and mechanical connection between the valve structure and the film sheet tube.

As will be appreciated from FIG. 6, the retaining ring surface 82 overlies a portion of the retaining ring surface 72, and upon the assembly being complete the ring section 66 thereby maintains the ring section 64 in position.

Preferably, the associated end 24 of the flexible sheet tube extends from the body member to the degree indicated in FIG. 6. Should a greater amount of material than that illustrated be present the material may be readily trimmed.

In the disclosed embodiment only a single layer of flexible sheet material is illustrated. However, it will be appreciated that two or three layers of flexible sheet material may be superimposed upon each other whereby the valve body member and retaining ring may be used to assemble the flexible sheet material together. For instance, if it was desired to locate a valve in the middle of a damper 12, with respect to the length thereof, the damper could be formed in two tube portions, utilizing three valves and a central valve structure could be used to interconnect the two flexible tubes together simply by associating the end regions of each tube with the central valve sturcture located therebetween. Of course, where multiple layers of flexible material are to be interposed between the body member and retaining ring opposed shoulders and surfaces, dimensional variations in the retainer ring will usually be made in order to assure proper pressures and relationships.

The damper 12 is initially folded within the cannister 10, and this folding merely consists of disposing the valves adjacent each other with the flexible sheet material sandwiched therebetween. Upon the sonobuoy components deploying upon engaging the water surface the transducer 16 will pull the lower valve 26 from the cannister and as it moves downwardly water will flow upwardly through the passage 34, displacing the valve element 46 from its valve seat surface 36, and fill the flexible sheet tube. The upper valve 26 will remain closed as the tube is filling, and very little air will be trapped within the tube due to the folded condition of the damper prior to deploying. Upon the damper tube being fully extended it will be substantially filled with water, and as the valve elements 46 of each valve 26 are disposed within the tube, the water cannot be displaced from the tube. Movement of the tube upwardly due to wave motion, may momentarily "open" the upper valve element 46 permitting any trapped air to escape, and further forcing water into the damper. The presence of the valves traps a static body or mass of water within the tube, adding a weight to the sonobuoy assembly to sufficiently provide the desired damping function.

While the valve structure is preferably formed of a synthetic plastic material which is of noncorrodable, economic and lightweight characteristics, it will be appreciated that the valve element components could be formed of metal. The configuration and relationships illustrated permits the valve element to be of a concise configuration having a small axial dimension, and yet the size of the passage means to the overall diameter of the check valve diamater is relatively large permitting a high capacity flow of water through the passage 34 in the desired direction. The resilient nature of the flapper valve element 46 provides little resistance to water flow through the passage means, in the desired direction, as the valve element will readily deflect about the rivet 44 from the body member side 36. However, the presence of the webs 40 prevent collapse of the valve element due to pressures applied to the valve element from within the flexible sheet tube.

It is appreciated that modifications to the inventive concept may be apparent to those skilled in the art without departing from the spirit and scope thereof.

We claim:

1. Check valve structure self-attachable to flexible sheet material comprising, in combination, an annular body member having an axis, an outer periphery, a central region, and first and second oppositely disposed sides defining an axial dimension of said body member, passage means defined in said central region intersecting said sides, unidirectional flow valve means mounted on said body member disposed across said passage means permitting unidirectional fluid flow through said passage means in the axial direction of said body member, and flexible sheet attachment means defined on said body member for attaching said body member to a flexible sheet material including annular first surfaces defined on said body member radially outwardly from and about said passage means, and an annular flexible sheet retaining ring having second surfaces of a configuration complementary to said first surfaces mounted upon said body member whereby said second surfaces thereof are disposed in opposed relation to said first surfaces for retaining a flexible sheet between said first and second surfaces in a sealed relationship to said body member, said retaining ring comprising first and second annular circular portions, said first portion having a continuous annular form, said second portion being radially split and capable of limited radial deflection, said second ring portion being in axial alignment with at least a portion of said first ring portion, and an annular retainer shoulder defined on said body member adapted to cooperate with and retain said second ring portion upon said body member to maintain the assembly of said body member and retaining ring.

2. Check valve structure self-attachable to flexible sheet material comprising, in combination, a disc-like body member of substantially rigid material having an axis, an outer circular periphery, a central region, a rim region intermediate said periphery and said central region, and first and second oppositely disposed sides defining an axial dimension of said body member, passage means defined in said central region intersecting said sides, a flexible flap valve mounted on said body member adjacent said first side thereof disposed across said passage means capable of being deflected away from said first side permitting unidirectional flow through said passage means from said second side to said first side, axially extending annular shoulder means defined on said rim region, radially extending annular surface means defined on said rim region and an annular retaining ring mounted upon said rim region having annular axial and radially extending shoulders and surfaces, respectively, corresponding in configuration to said body member shoulder and surface and in opposed relationship thereto whereby flexible sheet material may be interposed between said opposed shoulders and surfaces and be thereby affixed to said body member, means maintaining said retaining ring upon said body member rim region including a shoulder defined on said rim region of conical configuration defining a recess of increasing radial dimension, a shoulder of conical configuration defined upon said retaining ring adapted to cooperate with and be received within said recess, said retaining ring including a first annular portion and a second radially variable second annular portion, said first portion including a radial surface in axial alignment with said second annular portion and said shoulder of conical configu-ration defined on said retaining ring being defined on said second annular portion.

* * * * *